United States Patent [19]

Vaerewyck

[11] Patent Number: 4,768,848
[45] Date of Patent: Sep. 6, 1988

[54] FIBER OPTIC REPEATER

[75] Inventor: Eugene G. Vaerewyck, Albuquerque, N. Mex.

[73] Assignee: Westinghouse Electric Corp., Pittsburgh, Pa.

[21] Appl. No.: 55,580

[22] Filed: May 29, 1987

[51] Int. Cl.$^4$ ............................................. G02B 6/10
[52] U.S. Cl. ............................. 350/96.12; 350/96.13; 350/96.14
[58] Field of Search ...................... 250/227; 356/345; 332/7.5; 350/96.11, 96.12, 96.13, 96.14

[56] References Cited

U.S. PATENT DOCUMENTS

| | | | |
|---|---|---|---|
| H353 | 10/1987 | Taylor | 350/96.14 X |
| 4,058,722 | 11/1977 | Taylor | 350/96.14 X |
| 4,120,588 | 10/1978 | Chaum | 350/96.11 X |
| 4,325,603 | 4/1982 | Marom | 350/96.14 |
| 4,340,272 | 7/1982 | Papuchon et al. | 350/96.14 |
| 4,436,365 | 3/1984 | Hodgins et al. | 350/96.16 |
| 4,445,751 | 5/1984 | Divens et al. | 350/96.14 |
| 4,468,085 | 8/1984 | Papuchon et al. | 350/96.14 |
| 4,502,037 | 2/1985 | Le Parquier et al. | 350/96.14 X |
| 4,505,587 | 3/1985 | Haus et al. | 356/345 |
| 4,694,276 | 9/1987 | Rastegar | 350/96.14 X |
| 4,703,996 | 11/1987 | Glass et al. | 350/96.11 |

Primary Examiner—William L. Sikes
Assistant Examiner—Frank González

[57] ABSTRACT

A fiber optic repeater comprising a substrate of electro-optically sensitive material and an optical waveguide formed in the surface of the substrate and extending between longitudinally opposite edge portions of the substrate. The waveguide includes longitudinally opposite end portions each having a terminal face exposed at one of the edge portions of the substrate and a pair of laterally spaced-apart central portions joined to each of the end portions. The waveguide propagates the optical signals between the exposed terminal faces. First and second data branches are formed in the surface of the substrate to divert a portion of the optical signal being propagated by the waveguide before the signal enters the central portions of the waveguide. Each data branch has a connecting portion extending from an end portion of the waveguide and an output end opposite the connecting portion. A photodetector is coupled to the output end of each data branch to detect the portion of the optical signals diverted by the respective data branch. A system including a plurality of optical repeaters each having the capability to receive data from and transmit data to an optical fiber data bus also is disclosed.

6 Claims, 2 Drawing Sheets

FIBER OPTIC REPEATER

BACKGROUND OF THE INVENTION

1. Field of the Invention

The present invention relates to a fiber optic More particularly, the present invention relates to a fiber optic repeater that provides passive propagation of optical signals as well as the capability of inputting and reading data in the optical signals.

2. Description of the Related Art

Fiber optic communication systems are well known in the prior art. In a fiber optic local area network, for example, optical fibers are connected between a plurality of nodes at which data is read from and input to the optical signal propagated by the optical fibers. Conventional nodes having both reception and transmission capability, however, require active optical repeaters, which must be powered to propagate signals in the optical fiber data bus across the nodes. An electronics failure or power outage will disrupt service in the data bus. Consequently, it is desirable to provide local area network nodes with a repeater that provides continuous throughput of an optical signal even in the event of electronic failure or power outage. Purely passive optical repeaters, however, have the disadvantage of producing a cumulative attenuation that limits the capabilities of a fiber optic communication network.

In certain national security applications, fiber optic communication networks are particularly desirable because optical signals are not affected by electrical radiation that disrupts or produces noise in conventional electrical signals. In addition, optical signals provide greater security against electronic surveillance because they do not generate easily detectable radiation.

One particularly promising national-security application for fiber optic communication systems is in the underwater monitoring of surface ships and submarines. Such systems typically comprise a plurality of listening devices arrayed on the ocean bottom or in sub-surface locations. Transducers in the listening devices convert sound waves generated by marine vessels into electrical signals, which are relayed by submarine cables to surface monitoring stations. In view of the above-described security advantages of optical fibers, it is desirable to convert these electrical signals into optical signals at each node and to use optical fibers as the interconnecting cables between listening devices and the monitoring station. Such systems, however, require optical repeaters at the listening devices that will propagate very low-power optical signals and have a passive-throughput capability to prevent disruption of a system in the event of electronics failure.

One possible optical repeater for use in such underwater monitoring systems is disclosed in U.S. Pat. No. 4,445,751 issued to Divens et al., which is incorporated herein by reference. Divens et al. discloses an optical repeater using an optical waveguide interferometer formed in a lithium niobate substrate. The optical waveguide is formed in the upper surface of the substrate by diffusing titanium into the lithium niobate material. The waveguide divides into two substantially parallel branches to form the interferometer. The waveguide is symmetrical and bidirectional to permit light to propagate in either direction through the repeater. Electrodes positioned between the central branches of the waveguide as well as alongside outer portions of the substrate permit selective modulation of the optical signal to provide the capability of adding data to the optical signal at each mode.

Known interferometric optical repeaters, however, do not provide the capability of outputting data from the optical signal at the node. Such two-way communications is desirable in many communication networks, for example, to reprogram the undersea listening devices described above.

SUMMARY OF THE INVENTION

The present invention is intended to provide a fiber optic repeater having passive throughput capability as well as the ability to add data to and read data from optical signals propagated through the repeater.

The present invention also is intended to provide a fiber optic repeater having data transmission and reception capability that can be fabricated by conventional methods.

Furthermore, the present invention is intended to provide an optical repeater having a very low power drain.

Additional advantages of the present invention will be set forth in part in the description that follows and in part will be obvious from that description or can be learned by practice of the invention. The advantages of the invention can be realized and obtained by the device particularly pointed out in the appended claims.

The present invention overcomes the problems of prior art fiber optic repeaters by providing an interferometric repeater with data branches connected between photodetectors and the waveguide formed in the repeater substrate to permit reading of the optical signals propagated through the repeater.

To overcome the problems of the prior art fiber optic repeaters and in accordance with the purpose of the invention, as embodied and broadly described herein, the fiber optic repeater of this invention comprises a substrate having a pair of longitudinally opposite edge portions and an optical waveguide formed in the surface of the substrate and extending between the edge portions of the substrate. The waveguide includes a pair of longitudinally opposite end portions each having a terminal face exposed at one of the edge portions of the substrate and a pair of laterally spaced-apart central portions joined to each of the end portions. The waveguide propagates optical signals between the exposed terminals, and the repeater further comprises means for reading the optical signals propagated in the waveguide in advance of the signals entering the central portions.

In a preferred embodiment, the optical repeater comprises a lithium niobate substrate having first and second longitudinally opposite edge portions and an optical waveguide formed in the surface of the substrate and extending between the edge portions of the substrate. The waveguide includes first and second longitudinally opposite end portions each having a terminal face exposed respectively at the first and second edge portions of the substrate and a pair of laterally spaced-apart central portions joined to the first and second end portions. The central portions define an interior surface portion of the substrate therebetween. In the preferred embodiment, first and second data branches are formed in the surface of the substrate. The first and second data branches each have a connecting portion connected respectively to the first and second end portions of the waveguide and an output end opposite the connecting portion. Each data branch transmits to its output end a portion of the optical signals propagated from its respective end portion to the other end portion of the waveguide. A photodetector is connected to each output end to convert the portions of the optical signals transmitted by the data branches into electrical signals. The waveguide and data branches preferably are formed by diffusing titanium into the lithium niobate substrate. Preferably, the fiber optical repeater further comprises a first electrode affixed to the interior surface portion of the substrate and second and third electrodes affixed to portions of the substrate surface alongside the central portions of the waveguide and outside the interior surface portion to provide means for modulating the optical signals propagated in the waveguide to add data to the signals.

The accompanying drawings, which are incorporated in and which constitute a part of this specification, explain, together with the description, the principles of the invention.

DESCRIPTION OF THE PREFERRED EMBODIMENT

Reference now will be made in detail to the presently preferred embodiments of the invention, examples of which are illustrated in the accompanying drawings.

Figure 1:
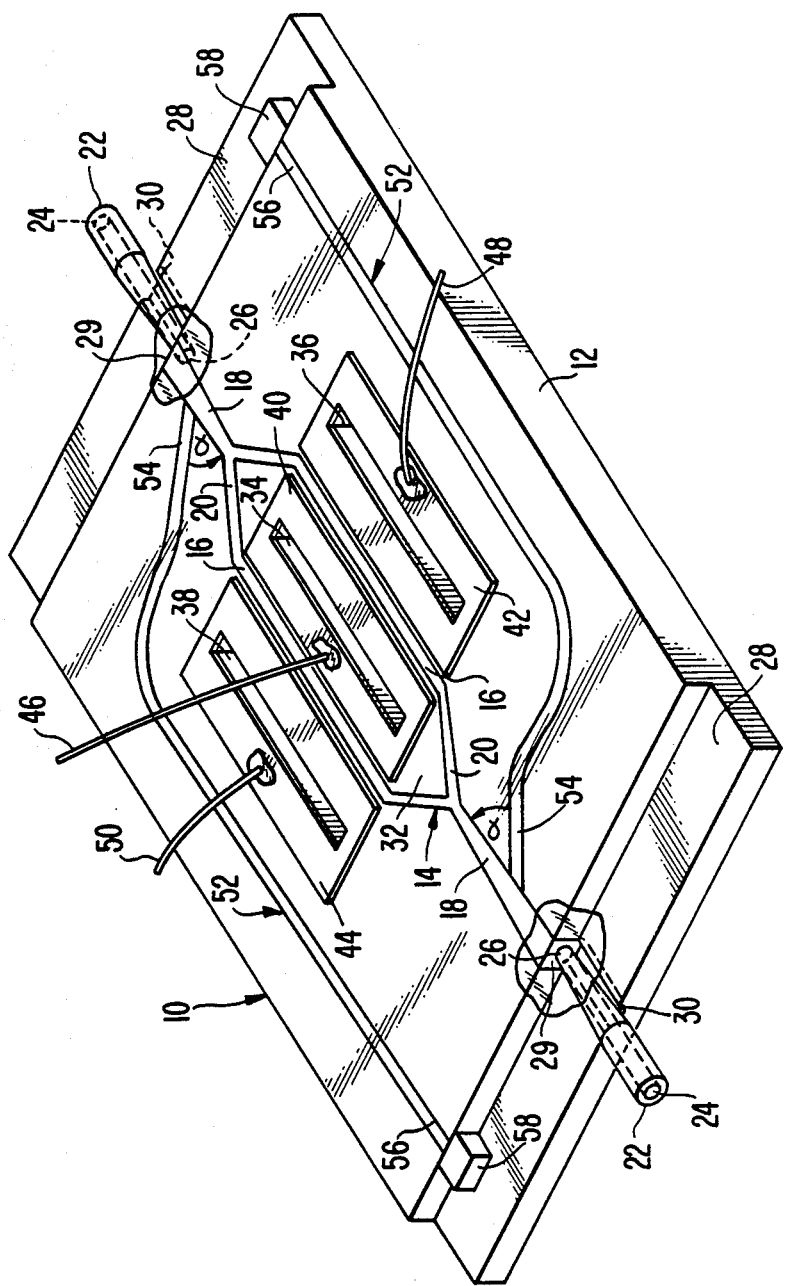
FIG. 1 is a perspective view of one embodiment of the fiber optic repeater of this invention.

FIG. 1 is a perspective view of one embodiment of the fiber optic repeater of this invention, designated generally by reference numeral 10. Repeater 10 comprises a substrate 12 formed of an electro-optically sensitive material, preferably $LiNbO_3$ lithium niobate. An optical waveguide, designated generally by reference numeral 14, preferably is formed in the upper surface of substrate 12 by diffusing titanium or other suitable material into the lithium niobate of substrate 12. Titanium diffusion can be performed by conventional methods, such as by patterning with photolithographic masks. The titanium diffusion waveguide typically has a depth of about 4–10 $\mu m$.

Other materials, such as $LiTaO_3$, $K_3Li_2Nb_5O_{15}$, $Ba_{0.27}Sr_{0.75}Nb_2O_{5.78}$, and $Ba_2NaNb_5O_{15}$ also can be used to form substrate 12, with appropriate diffusion, exchange, or implantation techniques to form waveguide 14. Semiconductor materials, such as GaAs, also can be used to form substrate 12. Use of a semiconductor substrate, however, limits the repeater to very short wavelength applications and usually results in high power losses as the optical signal propagates through the repeater.

As shown in FIG. 1, optical waveguide 14 extends between the longitudinal edges of substrate 12 and includes a pair of laterally-apart central portions 16 and a pair of longitudinally opposite end portions 18 adjacent the longitudinal edges of substrate 12. Central portions 16 are joined to each of the end portions 18 by Y-shaped splitter portions 20. The angle between the two branches of splitter portions 20 typically is about 1°. As shown in FIG. 1, central portions 16 preferably are substantially parallel. Waveguide 14 preferably is both longitudinally and laterally symmetrical to provide bidirectional passive propagation of optical signals with minimal attenuation.

Optical signals are carried to waveguide 14 by optical fibers 22, which are coupled to optical repeater 10 by conventional methods, such as that disclosed in U.S. Pat. No. 4,474,429 to Yoldas et al., which is incorporated herein by reference. In the embodiment of the invention shown in FIG. 1, optical fibers 22 are single mode fibers with an outer diameter of about 90–150 $\mu m$. Fibers 22 have a core 24 with a diameter of about 10 $\mu m$. The coupled end portions of fibers 22 are conical in shape and the exposed terminal faces 26 of cores 24 are polished flat to provide a suitable interface for coupling with waveguide 14.

In the repeater of this invention, the longitudinal edges of substrate 12 are adapted for coupling optical fibers 22 to end portions 18 of waveguide 14. As shown in FIG. 1, a small shelf-like portion 28 is etched in the upper surface adjacent each longitudinal edge of substrate 12 to expose a terminal face 29 of each end portion 18. Each shelf portion 28 includes a small alignment groove 30, formed, for example, by ion milling, longitudinally aligned with end portions 18 of waveguide 14. Alignment grooves 30 assist in positioning terminal faces 24 of optical fibers 22 in an abutting relationship with the exposed terminal faces 29 of waveguide 14.

In coupling fibers 22 to repeater 10, micromanipulators of a conventional type preferably are utilized to position the polished terminal faces 26 of fibers 22 in abutting relationship with the exposed terminal faces of optical waveguide 14. A small amount of optical-grade epoxy then is applied at the junction between each optical fiber 22 and waveguide 14. The epoxy flows around the cone-shaped end portions and between the exposed terminal faces 26 and 29. When the epoxy hardens, the optical fibers are permanently affixed to substrate 12. An epoxy having an index of refraction between that of glass and lithium niobate preferably is used to improve optical coupling efficiency.

In the preferred embodiment of the optical repeater shown in FIG. 1, an interior surface portion 32 of substrate 12 is enclosed by central portions 16 and splitter portions 20 of waveguide 14. A first groove 34 is etched in interior surface portion 32 of substrate 12. Second and third grooves 36 and 38 are etched in the upper surface of substrate 12 alongside central portions 16 of waveguide 14 outside interior surface portion 32. Grooves 34, 36, 38 are substantially parallel to central portions 16. Grooves 34, 36, 38 preferably penetrate the lithium niobate substrate 12 to a depth that substantially equals or is greater than the depth of optical waveguide 14. These grooves function to reduce cross coupling between the two central portions 16 and reduce the transmission of light into the lithium niobate substrate from the outer edges of central portions 16.

The optical repeater of this invention also includes mean for modulating the optical signals propagated in the waveguide to add data to the signals. As embodied herein, the modulating means includes first, second, and third electrodes 40, 42, and 44, which are affixed to the upper surface of substrate 12. Electrodes 40, 42, 44 typically are formed by conventional metal deposition methods, for example, by sputtering or evaporation of chromium, nickel, or gold through an appropriate mask. Electrodes 40, 42, 44 are positioned to correspond respectively to grooves 34, 36, 38 and preferably are rectangular in shape and parallel to central portions 16. These electrodes are utilized to selectively modulate the optical signal transmitted through repeater 10 by subjecting central portions 16 to differential electric fields.

As stated above, waveguide 14 preferably is symmetrical and bidirectional so that light can be transmitted in either direction with equal efficiency and, in the absence of any electric field generated by electrodes 40, 42, 44, waveguide 14 passively propagates the optical signal between the longitudinal edges of repeater 10 with minimal attenuation of the signal. The signal splits into two identical waveforms at one splitter portion 20, and the two waveforms are rejoined in phase at the other splitter portion 20. The velocity of light propagation through a waveguide, however, can be increased or decreased by imposing an electric field on the waveguide. Therefore, if differential electric fields are applied to the two central portions 16, the split waveforms will recombine with a phase shift corresponding to the electric field differential.

The differential electric fields are produced by applying a first voltage across electrodes 40 and 42 and a second voltage across electrodes 40 and 44. Alternatively, the velocity in one path can be modified by the application of voltage across its corresponding pair of electrodes while the velocity in the other path is maintained at a constant value. The voltages are applied by utilizing leads 46, 48, and 50, which are bonded respectively to electrodes 40, 42, and 44. In this manner, the optical signal exiting the repeater can be selectively modulated to transmit data originating at the repeater. Both digital and analog modulation are possible.

In accordance with the invention, optical repeater 10 further includes means for reading the optical signals propagated in the waveguide before the signals enter the central portions of the waveguide. As embodied herein, the reading means comprises a pair of data branches, generally designated by reference numeral 52, which are formed in the surface of substrate 12 in the same manner as and preferably at the same time that waveguide 14 is formed. Because single-mode wave propagation need not be maintained in the data branch, other methods such as proton exchange methods also can be used to form data branches 52. Data branches formed by proton exchange can have smaller useful radii of curvature than those formed by titanium diffusion.

Each data branch 52 includes a connecting portion 54 connected to one of the end portions 18 of waveguide 14. Each connecting portion 54 preferably forms an acute angle $\alpha$ with its respective end portion 18 to capture a portion of the optical signal travelling from the adjacent fiber 22 into end portion 18 but not signals travelling from central portions 16 to the adjacent fiber. Thus, each data branch 52 captures incoming optical signals only. Angle $\alpha$ preferably is about 1° but can be larger depending on the proportion of optical power to be tapped from the main waveguide. The larger the angle, the less is power tapped off. As shown in FIG. 1, each data branch 52 has an output end 56 opposite connection portion 54. The portion of the optical signal captured by connection portion 54 is transmitted to output end 56.

The reading means of the invention further includes photodetector means for converting the transmitted optical signal portion into electrical signals. As embodied herein, the photodetector means includes a photodetector 58 mounted on each shelf-like portion 28 and butt coupled to output end 56. Alternatively, photodetectors 58 can be formed in the surface of substrate 12 by conventional methods, such as epitaxial growth methods, when a semiconductor substrate such as GaAs is used.

The operation of fiber optic repeater 10 as part of a multi-node fiber optic communication system now will be described with reference to FIG. 2, in which components described above and shown in FIG. 1 have the same reference numerals.

Figure 2:
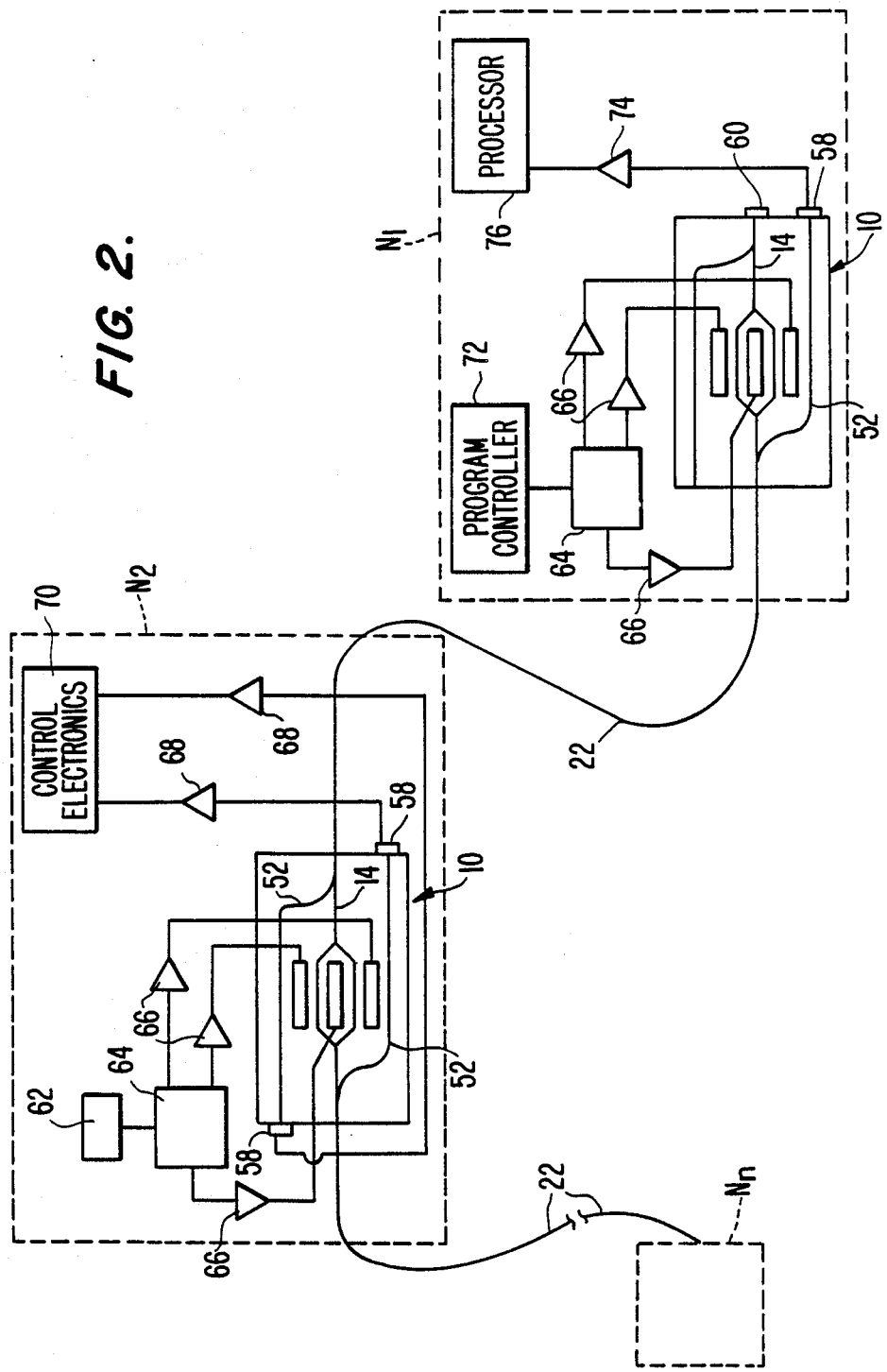
FIG. 2 is a schematic view of a fiber optical communication system using the fiber optic repeater of this invention.

FIG. 2 is a schematic diagram of a multi-node fiber optic communication system that could be used, for example, for underwater vessel surveillance. Two nodes, designated $N_1$ and $N_2$, are shown. Each node includes a fiber optic repeater 10 coupled to opposite ends of an optical fiber 22. Node $N_2$ is coupled to another optical fiber 22 that, in turn, is coupled to a third node $N_3$ (not shown). Node $N_1$ is a terminal node that includes a laser diode 60 butt coupled to one terminal face of waveguide 14 to generate the base optical signal to be carried from node $N_1$ to node $N_2$ and so on to a second terminal node Nn (not shown), which also would have a laser diode 60 to generate an optical signal travelling in the opposite direction, toward node $N_1$. Diode 60 preferably generates light having a wavelength of about 1.3 $\mu$m.

Node $N_2$ shows the typical configuration of all the intermediate nodes of the exemplary underwater surveillance system. Electrical signals generated by transducer 62 are converted by a modulator 64 that is connected by amplifiers 66 to electrodes 40, 42, 44. Modulator 64 controls the voltages applied across the electrodes to modulate the optical signal carrier by central portions 16 of waveguide 14, thus impressing upon the optical signals propagated through repeater 10 data corresponding to the sounds detected by transducer 62. With an optical signal having a wavelength of 1.3 $\mu$m, there should be a capacitance of about 1 pf between adjacent electrodes with a voltage swing of about 9 volts. Photodetectors 58 are connected by amplifiers 68 to control electronics 70, which control operation of the underwater listening device at node $N_2$. Programming signals generated elsewhere in the system are converted by photodetectors 58 into electrical signals that are read by control electronics 70.

Node $N_1$ is similar to node $N_2$, except that a program controller 72, rather than a transducer 62, is connected to modulator 64. Program controller 72 impresses data on the optical signal originated by diode 60 at node $N_1$. In addition, node $N_1$ includes only a single photodetector 58, the output of which is connected via an amplifier 74 to a processor 76, which processes the data impressed by the intermediate nodes on the optical signal originated by the other terminal node, $N_n$.

In accordance with the invention, a fiber optic communication system can be provided with optical repeaters that provide continuous throughput of an optical signal at each node even in the event of electronics failure or power outage and that provides for data transmission and reception at each repeater and in both directions on the data bus. CMOS (complementary metal oxide silicon) circuitry preferably is used for the control electronics and amplifiers to ensure a low power drain. When a system in accordance with this invention uses high-power laser diodes, single-mode optical fibers, and presently available sensitive photodetectors, it is possible to have fiber optic links greater than 100 km in length between repeaters.

It will be apparent to those skilled in the art that modifications and variations can be made in the device of this invention without departing from the scope of the invention. For example, laser diodes emitting light at a frequency different from 1.3 $\mu$m as well as other laser generating means can be used to produce the optical signal. The present invention can be used in applications other than in underwater vessel surveillance, for example, in local area networks requiring data transmission and reception at individual nodes in the network. The invention in its broader aspect is, therefore, not limited to the specific details and illustrated examples shown and described. Accordingly, it is intended that the present invention cover such modifications and variations, provided that they fall within the scope of the appended claims and their equivalents.

I claim as my invention:

1. A fiber optic repeater, comprising:
   a substrate having a pair of longitudinally opposite edge portions;
   an optical waveguide formed in the surface of said substrate and extending between said edge portions of said substrate, said waveguide including a pair of longitudinally opposite end portions each having a terminal face exposed at one of said edge portions of said substrate and a pair of laterally spaced-apart central portions joined to each of said end portions, said waveguide propagating optical signals between said terminal faces; and
   means for detecting the optical signals propagated in said waveguide in advance of the signals entering said central portions.

2. The fiber optic repeater of claim 1, further comprising means for modulating the optical signals propagated in said waveguide to add data to the signals.

3. A fiber optic repeater, comprising:
   a. a substrate of electro-optically sensitive material having first and second longitudinally opposite edge portions;
   b. an optical waveguide formed in the surface of said substrate and extending between said edge portions of said substrate, said waveguide including first and second longitudinally opposite end portions each having a terminal face exposed respectively at said first and second edge portions of said substrate and a pair of laterally spaced-apart central portions joined to said first and second end portions, said central portions defining therebetween an interior surface portion of said substrate, said waveguide propagating optical signals between said terminal faces.
   c. a data branch formed in said surface of said substrate, said data branch having a connecting portion extending from said first end portion of said waveguide and an output end opposite said connecting portion, said data branch transmitting to said output end a portion of the optical signals propagated from said first end portion to second end portion of said waveguide; and
   d. photodetector means communicating with said output end of said data branch for converting the portion of the optical signals transmitted by said data branch into electrical signals.

4. The fiber optic repeater of claim 3, further comprising:
   a second data branch formed in said surface of said substrate, said second data branch having a connecting portion extending from said second end portion of said waveguide and an output end opposite said connecting portion, said second data branch transmitting to said output end a portion of the optical signals propagated from said second end portion to said first end portion of said waveguide; and
   second photodetector means communicating with said output end of said second data branch for converting the portion of the optical signals transmitted by said second data branch into electrical signals.

5. The fiber optic repeater of claim 3, further comprising a first electrode affixed to said interior surface portion of said substrate and second and third electrodes affixed to portions of the surface of said substrate alongside said central portions of said waveguide and outside said interior surface portion.

6. A fiber optic repeater, comprising:
   a. a substrate of lithium niobate having first and second longitudinally opposite edge portions;
   b. an optical waveguide, formed by diffusion of titanium into the surface of said substrate and extending between said edge portions of said substrate, said waveguide including first and second longitudinally opposite end portions each having a terminal face exposed respectively at said first and second edge portions of said substrate and a pair of laterally spaced-apart central portions joined to said first and second end portions, said central portions defining therebetween an interior surface portion of said surface of said substrate, said waveguide propagating optical signals between said terminal faces;
   c. a first data branch, formed by diffusion of titanium into said surface of said substrate, said first data branch having a connecting portion extending from said first end portion of said waveguide and an output end opposite said connecting portion, said first data branch transmitting to said output end a portion of the optical signals propagated from said first end portion to said second end portion of said waveguide;
   d. a first photodetector coupled to said output end of said first data branch;
   e. a second data branch, formed by diffusion of titanium into said surface of said substrate, said second data branch having a connecting portion extending from said second end portion of said waveguide and an output end opposite said connecting portion, said second data branch transmitting to said output end a portion of the optical signals propagated from said second end portion to said first end portion of said waveguide; and
   f. a second photodetector coupled to said output end of said second data branch.

* * * * *